STABLE FLUID EMULSIONS OF ASPHALT AND OTHER OLEORESINOUS MATERIALS AND PREPARATION THEREOF

Mervin E. Conn, Westfield, N.J., assignor to Esso Research and Engineering Company, a corporation of Delaware
No Drawing. Filed Jan. 29, 1963, Ser. No. 254,593
11 Claims. (Cl. 252—311.5)

This invention relates to new anionic emulsifiers useful in preparing emulsions of asphalt and other oleoresinous materials in water. In particular, this invention relates to the use of alkyl and alkoxyalkyl phosphoric acids (and their salts), prepared by treating $C_8$ Oxo bottoms with a suitable phosphating agent, as emulsifiers for asphalt and other oleoresinous substances.

The Oxo process is well known in the art as a means of converting olefinic compounds into primary alcohols. The first stage of this process involves the reaction of an olefin with carbon monoxide and hydrogen in the presence of a catalyst, usually a reactive salt of cobalt, according to the following equation:

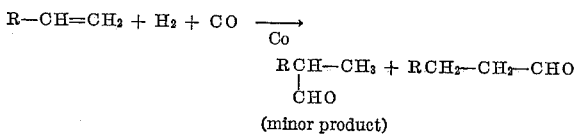

(minor product)

In the second stage, the above aldehydes are reduced in situ to the corresponding alcohols. These alcohols are then obtained as pure products by fractionation of the reaction mixture. The distillation of the alcohol fractions has been found to leave an amount of residue or bottoms which varies in quantity and composition depending on the identity of the olefinic starting material, catalyst, and operating conditions. In the case of a $C_7$ olefin stream, it has been found that the residue of the alcohol distillation contains a considerable amount of $C_{16}$ and $C_{17}$ dimer compounds. The $C_{17}$ compounds are alkoxyalkanols, having two oxygens per molecule, one being an ether and the other an alcohol function. The structures of this significant fraction of the $C_8$ Oxo bottoms are probably those of the isooctoxy isononyl alcohols, namely:

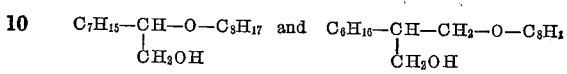

Up to the present time, the commercial value of most of the $C_8$ Oxo bottoms production has been limited to their value as fuels. Since these $C_8$ Oxo bottoms are readily available in large quantities as by-products of the Oxo process, they form an excellent and inexpensive raw material source. It is necessary, however, to first upgrade these Oxo bottoms into compounds suitable for commercial purposes since the bottoms as found are not in useable form.

It is therefore an object of this invention to provide a method whereby $C_8$ Oxo bottoms are converted into commercially useable products. Another object of this invention is the preparation of emulsions of asphalt and other oleoresinous substances utilizing as emulsifiers $C_8$ Oxo bottoms treated with suitable phosphating agents.

The bottoms from the commercial manufacture of $C_8$ Oxo alcohols consist of (1) a light fraction of $C_8$ to $C_{10}$ alcohols along with glycols from any dienes in the Oxo feed, (2) intermediate fractions of $C_{16}$ alcohols and $C_{17}$ alkoxyalkanols along with some esters and ethers, and (3) a heavy (bottoms) fraction of higher molecular weight alcohols and esters. While useful emulsifiers can be made by $P_2O_5$ treating any of these fractions or mixtures thereof, the light fraction and the fraction containing the $C_{17}$ alkoxyalkanol are the preferred starting materials.

The various fractions are obtained by ordinary vacuum fractionation. The results of a batch fractionation of a typical sample of $C_8$ Oxo bottoms made in laboratory glass equipment are shown in Table I below.

TABLE I.—COMPOSITION OF $C_8$ OXO BOTTOMS BY DISTILLATION AND ANALYSES OF FRACTIONS

[Charge: 3,500 cc. of $C_8$ Oxo bottoms]

| Cut No. | Vol. Percent | Boiling Points | | | | Hydroxyl No., mg. KOH/g. | Sap. No., mg. KOH/g. | Carbonyl No., mg. KOH/g. | Neut. No., mg. KOH/g. |
|---|---|---|---|---|---|---|---|---|---|
| | | Range, °C. at 3 mm. | Mid. Pt., °C. at 3 mm. | Range, °F. at 760 [1] | Mid. Pt., °F. at 760 [1] | | | | |
| 1–9 | 0–45 | 52–64 | 59 | 386–415 | 403 | 402.6 | 1.3 | | |
| 10 | 45–50 | 64–96 | 72 | 415–490 | 434 | 237.9 | 15.0 | 0.2 | 8.7 |
| 11–13 | 50–60 | 96–109 | 109 | 490–520 | 520 | 46.7 | 45.2 | 0.4 | 2.5 |
| 14 | 65–70 | 109–122 | 116 | 520–550 | 536 | 73.0 | 52.6 | 0.45 | 0.1 |
| 15–16 | 70–80 | 122–132 | 123 | 550–572 | 552 | 93.3 | 59.9 | 0.17 | 0.0 |
| 17–18 | 80–90 | 132–150 | 141 | 572–612 | 592 | 178.9 | 21.2 | 0.45 | 0.1 |
| 19 | 90–94.8 | 150–165 | 157 | 612–646 | 629 | 179.7 | 16.6 | 0.40 | 0.1 |
| Bottoms | 94.8–100 | (*) | (*) | (*) | (*) | (*) | (*) | (*) | (*) |
| Charge | 100 | 52–165 | 96 | 386–646 | 490 | [2] 251.7 [3] 229 | | | |

TABLE I.—Continued

| | Wt. Percent Oxygen | | Mol. Wt. (Osmometer) | "Ether Oxygen," wt. percent by diff.[7] | Wt. Percent of Cut Accounted For | | | Indicated Composition |
| --- | --- | --- | --- | --- | --- | --- | --- | --- |
| | Measured | Calculated [6] | | | By OH CO and Sap. No.[8] | By "Ether Oxygen" | Total [9] | |
| | A [4] | B [5] | | | | | | | |
| 1-9 | | 11.57 | 11.5 | 169 | 0 | 122 | | 122 | $C_8$–$C_{10}$ alchols and glycols (dienes in feed). |
| 10 | 9.50 | 10.85 | 7.63 | 183 | 2.5 | 82.4 | 33.2 | 116 | Alcohols, acids, esters, ethers. |
| 11-13 | 7.53 | 8.00 | 3.91 | 244 | 3.8 | 40.1 | 55.0 | 95 | Alcohols esters, ethers, hydrocarbons. |
| 14 | 8.50 | 8.74 | 5.10 | 244 | 3.5 | 54.8 | 51.8 | 107 | Alcohols, esters, ethers. |
| 15-16 | 9.44 | 9.45 | 6.08 | 246 | 3.4 | 67.2 | 50.7 | 118 | Alcohols, esters, ethers, ether-alc., ether-esters. |
| 17-18 | 9.34 | 10.00 | 6.32 | 270 | 3.4 | 96.5 | 51.5 | 148 | Alcohols, ether-alcohols,[10] esters. |
| 19 | 8.81 | 8.90 | 6.08 | 272 | 2.8 | 95.5 | 45.9 | 141 | Do. |
| Bottoms | (*) | (*) | (*) | (*) | (*) | (*) | (*) | (*) | (*). |
| Charge | | | | [2] 210 [3] 213 | | | | | |

[1] Approximations obtained by extrapolation, using correlations based on hydrocarbon data. Extrapolated from B. Pt. and 3 mm. to B. Pt. at 760 mm.
[2] Determined.
[3] Calculated from cuts, ignoring differences in gravities.
[4] Method A—Unterzaucher Method, involving pyrolysis of sample.
[5] Method B—Involves radioactivity of sample with detection and measurement of activated oxygen. Sample of isooctyl alcohol showed 11.85% oxygen versus 12.3% theoretical (100% purity).
[6] Based on hydroxyl, carbonyl and saponification numbers.
[7] Average of measured minus calculated wt. percent oxygen.
[8] Molecular weight/equivalent weight from Σ OH, saponification and CO numbers ×100.
[9] Taking all data at face value, figures over 100% indicate more than one oxygenated group per average molecule. The 95% value for cuts 11 thru 13 may indicate the presence of some hydrocarbons.
[10] Probably largely the ether-alcohols identified in earlier strudies, viz., $C_6$–C–C–O–$C_1$ and $C_7$–C–O–$C_8$, 269 mol. wt., 600° F. at 760 mm.

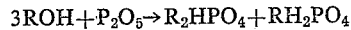
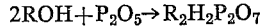

\* No data obtained.

As shown in Table I, the initial fractions, cuts 1 through 9, are almost exclusively $C_8$ to $C_{10}$ alcohols which react with $P_2O_5$ to form mixtures of alkyl phosphoric acids, for example:

$$3ROH + P_2O_5 \rightarrow R_2HPO_4 + RH_2PO_4$$

$$2ROH + P_2O_5 \rightarrow R_2H_2P_2O_7$$

Actually, the reactions are more complex than indicated by the above simple equations and the product mixtures obtained are characterized by measuring total acidity, i.e., total acid numbers (TAN) in mg. KOH/g.

Cuts 11 through 16 of Table I are mixtures of alcohols, ethers and esters in the $C_{16}$, 245 mol. wt. range. These fractions may be $P_2O_5$ treated, as is, or after rerunning over caustic to saponify and remove the esters present.

Cuts 17 through 19 are substantially all alcohols and alkoxy alcohols and consist largely of the isooctoxy isononyl alcohols, mentioned above. This fraction may be $P_2O_5$ treated, as is, or after rerunning over caustic to saponify and remove the small amount of esters present.

The $C_8$ Oxo bottoms or fractions are treated with a phosphating agent such as phosphorus pentoxide, phosphoric acid, phosphorus trichloride, phosphorus oxychloride and the like. It is preferred that the phosphating agent be phosphorus pentoxide. The reactants are mixed together and the temperature is gradually raised to 160–190° F., where it is maintained for 2 to 8 hours until the reaction is complete. The stoichiometric ratio for this reaction is about 2 to 3 mols, or equivalents based on hydroxyl number, of alcohols per mol of phosphating agent. Preferably, the ratio is 2 mols of alcohols per mol of phosphating agent.

To form an emulsifier for the emulsification of asphalt and other oleoresinous materials in water, it is necessary that the alkyl or alkoxy phosphoric acids be neutralized with sufficient alkaline material to form a water soluble, or highly dispersible salt. An excess of alkaline material may be used. Alkaline materials which can be used for this purpose include sodium hydroxide, potassium hydroxide, sodium carbonate, sodium acetate, ammonium hydroxide, ammonia, sodium silicate, ethanolamine, diethanolamine, triethanolamine, methylamine, dimethylamine, ethylamine, propylamine, morpholine, pyridine, ethylene diamine, and the like. Preferred bases for this neutralization are sodium hydroxide and potassium hydroxide. The most preferred base is potassium hydroxide. Furthermore, excess potassium hydroxide up to 400% of that amount necessary to neutralize the alkoxyalkanol phosphoric acid may be used, e.g. 0.06 to 0.45 wt. percent on water is the total potassium hydroxide used. Use of up to 100% excess sodium hydroxide has been tried with favorable results; a larger excess appears unnecessary and undesirable.

Stable emulsions of asphalt-in-water can be made by mixing 40%–70%, e.g. 60%, asphalt with 60% to 30%, e.g. 40%, water in the presence of 0.2–0.8, e.g. 0.2–0.4 wt. percent on asphalt of an alkyl or alkoxy phosphate emulsifier in a Moritz Mixer or more preferably in a colloid mill. Best results are obtained when the alkyl-alkoxy phosphoric acid is added to the asphalt or oleoresinous material while the alkaline material is added to the water layer before mixing.

Emulsions having greater stability can be prepared by adding stabilizers, such as sodium lignin sulfonate; highly polymerized ethylene oxide; alkali salts of sulfonated polystyrenes; high molecular weight, water-soluble cellulosic materials; sodium silicates; sodium alginates; carboxypolymethylene salts (e.g. Carbopol 941 by B. F. Goodrich Chemical Co.) and high molecular weight polyvinyl alcohols to the water phase. Useful emulsions are also obtained by using a composite emulsifier made up of a major amount (60–95 wt. percent) of alkyl-alkoxy phosphoric acids and a minor amount (40–5 wt. percent) of lower weight alkyl phosphoric acids, e.g. ethyl, propyl, butyl and pentyl phosphoric acids, made by treating 2 to 4 mols, e.g. 3 mols, of the $C_2$ to $C_5$ alcohol with one mol of phosphorus pentoxide. A preferred lower molecular weight alcohol is ethyl alcohol.

The emulsifier prepared by the practice of this invention can be used to emulsify asphalt, oleoresinous products such as wax, resins, rubber paints and similar materials, wetting agents, textile assistants, dedusting agents for alkaline dusts, pesticide concentrates, detergents, textile lubricants and antistatic agents in water. Other uses will suggest themselves to those skilled in the art.

The following specific examples will serve further to illustrate the practices and advantages of the invention. These examples are for illustration and are not to be regarded as limitations of the instant invention:

*Example 1*

A fluid asphalt-in-water emulsion is prepared by first adding 0.2 wt. percent on asphalt of the alkyl phosphoric acids obtained when two equivalents of the front ends of the $C_8$ Oxo bottoms consisting of $C_8$ to $C_{10}$ alcohols are treated with one mol of phosphorus pentoxide, to a 150/200 Pen. asphalt. The above material (60%) is heated to 239° F. and then mixed in a Moritz Mixer with a hot water layer (40%, 176° F.) which contains 0.45 wt. percent on water of potassium hydroxide to give the desired emulsion.

Example 2

The process of Example 1 is repeated except that the water layer contains an additional 2.7 wt. percent on water of a 40° Baumé sodium silicate solution.

Example 3

The process of Example 1 is repeated except that the water layer contains an additional 0.5 wt. percent on water of Indulin C (a sodium lignin sulfonate).

Example 4

The process of Example 1 is repeated except that 0.4 wt. percent on asphalt of the alkyl phosphoric acid emulsifier is added to the asphalt and 0.23 wt. percent on water of sodium hydroxide is substituted as the base in the water layer.

Example 5

The process of Example 4 is repeated except that the water layer contains an additional 1.3 wt. percent on water of a 40° Baumé sodium silicate solution.

Example 6

The process of Example 4 is repeated except that the water layer contains an additional 0.2% of a sodium lignin sulfonate such as Indulin C sold by The West Virginia Pulp and Paper Company.

Example 7

The process of Example 4 is repeated except that the water layer contains an additional 0.0004% of Carbopol 941, a high molecular weight carboxypolymethylene salt available from B. F. Goodrich Chemical Company.

Example 8

The 260 to 275 molecular weight fractions of $C_8$ Oxo bottoms is removed by fractionation, treated with $P_2O_5$ at the rate of two equivalents of alcohol per mol of $P_2O_5$ to form an alkoxy phosphoric acid emulsifier. This emulsifier is added to 150/200 Pen. asphalt to the extent of 0.4 wt. percent and 60% of the additive treated asphalt is heated to about 239° F. and vigorously mixed with 40% of a hot water layer containing 0.45% of potassium hydroxide to form a useful asphalt-in-water emulsion.

Example 9

The process of Example 8 is repeated except the 260 to 280 molecular weight fraction is purified by rerunning over caustic before $P_2O_5$ treating.

Example 10

The total $C_8$ Oxo bottoms are $P_2O_5$ treated at the rate of two equivalents of alcohols per mol of $P_2O_5$, and 0.4 wt. percent of the resulting alkyl-alkoxy phosphoric acids are added to 150/200 Pen. asphalt, which is then heated to about 239° F. and emulsified with 40% of hot water containing 0.45% of potassium hydroxide.

Example 11

A useful asphalt-in-water emulsion is prepared by using a composite emulsifier in conjunction with the asphalt layer. This emulsifier is obtained by combining 75 wt. percent of alkyl-alkoxy phosphoric acids derived from $C_8$ Oxo bottoms as in Example 10 with 25 wt. percent of ethyl phosphoric acids derived from the reaction of 3 mols of ethanol with one mol of phosphorus pentoxide. The composite emulsifier is used in a concentration of 0.2 wt. percent on asphalt in 150/200 Pen. Baltimore asphalt. The molten asphalt plus emulsifier (60%) is mixed in a colloid mill with hot water (40%) containing 0.45 wt. percent on water of potassium hydroxide to yield the desired emulsion.

Example 12

The process of Example 11 is repeated except that 0.4 wt. percent on asphalt of the alkylalkoxy-ethyl phosphoric acid composite emulsifier is added to the asphalt and 0.23 wt. percent on water of sodium hydroxide is substituted as the base in the water layer.

A summary of results obtained in the study of asphalt emulsions using alkyl phosphate type emulsifiers is shown in Table II.

TABLE II.—SUMMARY OF RESULTS ON ALKYL PHOSPHATE TYPE EMULSIFIERS
[60% 150/200 Pen. Asphalt; 40% Water; Moritz Mixer]

| Alkyl/Alkoxy Phosphoric Acids (APA) | | | Alkali | | APA Requirements, Weight Percent APA [4] | |
|---|---|---|---|---|---|---|
| Alcohol Used | $P_2O_5$ Treat [1] | Acidity Tan [2] | Weight Percent [3] | Percent Excess | O.K. [5] | N.G. [6] |
| Reduced [7] $C_8$ Oxo Btms | 2 | 144 | .37 KOH | 0 | 1.7 | 0.8 |
| Total $C_8$ Oxo Btms | 3 | 189 | .33 NaOH | -------- | ([8]) | 1.7 |
| Do | 2 | 201 | .31-.62 KOH | 414 | 0.2-0.4 | -------- |
| Do | 2 | 201 | .11-.22 NaOH | 28 | 0.4-0.8 | 0.2 |
| 25% ETOH | 3 | *303 | .45 KOH | 397 | 0.2 | -------- |
| 75% Total $C_8$ Oxo Btms | 2 | | | | | |
| 25% ETOH | 3 | *303 | .23 NaOH | 77 | 0.4 | -------- |
| 75% Total $C_8$ Oxo Btms | 2 | | | | | |
| Light ($C_8$-$C_{10}$) Fraction from $C_8$ Oxo Btms | 2 | 279 | .23 NaOH | 92 | 0.4 | -------- |
| Do | 2 | 279 | .45 KOH | 438 | 0.2 | -------- |

[1] Equivalents of alcohol per mol of $P_2O_5$.
[2] Total acid number of alkyl/alkoxy phosphoric acids.
[3] Wt. percent on water.
[4] Wt. percent on asphalt.
[5] The lowest concentration of APA tried which gave a satisfactory emulsion and one of borderline stability when prepared in a Moritz Mixer.
[6] The highest concentration of APA tried which gave no emulsion or an inverted emulsion (i.e. a water in asphalt "grease").
[7] Stripped at 400° F. to remove light ends.
[8] All emulsions tried with NaOH were unsatisfactory; KOH while not tried with this particular emulsifier would probably give satisfactory emulsions.
*Average.

Various modifications and variations of this invention will be obvious to a worker skilled in the art and it is understood that such modifications and variations are to be included within the purview of this application and the spirit and scope of the appended claims.

What is claimed is:

1. A stable, fluid emulsion comprising 40–70 wt. percent of asphalt in 30–60 wt. percent water and 0.2 to 0.8 wt. percent on asphalt of an emulsifier, said emulsifier comprising the potassium salt of phosphorus pentoxide treated $C_8$ Oxo bottoms.

2. The emulsion of claim 1 wherein the said emulsifier comprises a mixture of 75% of the potassium salts of $C_{17}$ alkoxyalkyl phosphoric acids and 25% of the potassium salts of ethyl phosphoric acids.

3. A method of preparing stable, fluid emulsions of asphalt and other oleoresinous materials in water which comprises forming an oleoresinous layer by adding to said oleoresinous material 0.2 to 0.8 wt. percent on oleoresinous material of an emulsifier component comprising $C_8$ Oxo bottoms treated with a phosphating agent in an amount sufficient to convert said bottoms to a phosphoric acid, wherein said phosphating agent is selected from the group consisting of phosphorus pentoxide, phosphoric acid, phosphorus trichloride and phosphorus oxychloride; and vigorously mixing said oleoresinous layer with a water layer containing an alkaline material in an amount sufficient to form a dispersible, water-soluble salt with said emulsifier component; said emulsion being characterized by containing from about 40% to about 70% by weight of said oleoresinous material and from about 30% to about 60% by weight of water.

4. A method of preparing stable, fluid emulsions of asphalt in water which comprises vigorously mixing (a) 50–75 wt. percent molten asphalt, (b) 0.2–0.8 wt. percent on asphalt of an emulsifier component comprising $C_8$ Oxo bottoms treated with a phosphating agent in an amount sufficient to convert said bottoms to a phosphoric acid, wherein said phosphating agent is selected from the group consisting of phosphorus pentoxide, phosphoric acid, phosphorus trichloride and phosphorus oxychloride, (c) 25–50 wt. percent hot water and (d) an alkaline material in an amount sufficient to form a dispersible, water-soluble salt with said emulsifier component.

5. The method of claim 4 wherein the emulsifier component is added to the asphalt and the alkaline material is added to the water prior to mixing of the asphalt and water.

6. The method of claim 4 wherein said emulsifier component comprises $C_8$ Oxo bottoms treated with phosphorus pentoxide in the ratio of two alcohol equivalents of $C_8$ Oxo bottoms per mole of phosphorus pentoxide and wherein said alkaline material is about 0.06 to 0.45 wt. percent on water of potassium hydroxide.

7. The method of claim 4 wherein said emulsified component is a composite consisting essentially of 60–95 wt. percent of the alkyl-alkoxy phosphoric acids made by treating two alcohol equivalents of $C_8$ Oxo bottoms with one mole of phosphorus pentoxide and 5–40 wt. percent of a lower molecular weight alkyl phosphoric acid selected from the group consisting of ethyl, propyl, butyl and pentyl phosphoric acids.

8. A method of preparing stable, fluid emulsions of asphalt and other oleoresinous materials in water which comprises forming an oleoresinous layer by adding to said oleoresinous material 0.2 to 0.8 wt. percent on oleoresinous material of an emulsifier component comprising the $C_8$ to $C_{10}$ alcohols in the front ends of $C_8$ Oxo bottoms treated with a phosphating agent in an amount sufficient to convert said alcohols to a phosphoric acid, wherein said phosphating agent is selected from the group consisting of phosphorus pentoxide, phosphoric acid, phosphorus trichloride and phosphorus oxychloride; and vigorously mixing said oleoresinous layer with a water layer containing an alkaline material in an amount sufficient to form a dispersible, water soluble salt with said emulsifier component; said emulsion being characterized by containing from about 40% to about 70% by weight of said oleoresinous material and from about 30% to about 60% by weight of water.

9. The method of claim 8 wherein said front ends of $C_8$ Oxo bottoms are treated with phosphorus pentoxide in the ratio of two alcohol equivalents of the $C_8$ to $C_{10}$ front end fraction of $C_8$ Oxo bottoms per mole of phosphorus pentoxide, wherein the phosphorus pentoxide treated alcohols is 0.2 to 0.4 wt. percent of the oleoresinous layer, and wherein said alkaline material is potassium hydroxide present at about 0.06 to 0.45 wt. percent on water.

10. A method of preparing stable, fluid emulsions of asphalt and other oleoresinous materials in water which comprises forming an oleoresinous layer by adding to said oleoresinous material 0.2 to 0.8 wt. percent on oleoresinous material of an emulsifier component comprising $C_{17}$ alkoxyalkyl phosphoric acids obtained by treating the 260 to 275 molecular weight fraction of $C_8$ Oxo bottoms with phosphorus pentoxide in the mole ratio of two alcohol equivalents of said bottoms to one mole phosphorus pentoxide; and vigorous mixing said oleoresinous layer with a water layer containing potassium hydroxide or sodium hydroxide in an amount sufficient to form a dispersible, water soluble salt with said emulsifier component; said emulsion being characterized by containing from about 40% to about 70% by weight of said oleoresinous material and from about 30% to about 60% by weight of water.

11. The method of claim 10 wherein said emulsifier component is a composite consisting essentially of 60–95 wt. percent of said $C_{17}$ alkoxyalkyl phosphoric acid and 5–40 wt. percent of a lower molecular weight alkyl phosphoric acid selected from the group consisting of ethyl, propyl, butyl and pentyl phosphoric acids.

References Cited

UNITED STATES PATENTS

| | | | |
|---|---|---|---|
| 2,512,580 | 6/1950 | McCoy | 252—311.5 |
| 2,620,312 | 12/1952 | Manzer | 252—311.5 |
| 2,624,750 | 1/1953 | Pechukas | 260—461.3 |
| 2,712,506 | 7/1955 | Farris | 106—277 |
| 3,167,577 | 1/1965 | Malone | 260—461.3 |

LEON D. ROSDOL, *Primary Examiner.*

JULIUS GREENWALD, *Examiner.*

R. D. LOVERING, *Assistant Examiner.*